(12) United States Patent
Okubo

(10) Patent No.: US 7,192,353 B2
(45) Date of Patent: Mar. 20, 2007

(54) VIDEO GAME APPARATUS, GAME PROGRESS METHOD AND GAME PROGRESS PROGRAM

(75) Inventor: Satoru Okubo, Osaka (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 481 days.

(21) Appl. No.: 10/174,191

(22) Filed: Jun. 17, 2002

(65) Prior Publication Data

US 2002/0198045 A1 Dec. 26, 2002

(30) Foreign Application Priority Data

Jun. 22, 2001 (JP) ............... 2001-189493

(51) Int. Cl.
*G06F 17/00* (2006.01)
*G06F 19/00* (2006.01)

(52) U.S. Cl. ............... 463/43; 463/1; 463/29

(58) Field of Classification Search ............ 463/29, 463/43, 44, 45, 20, 30, 35, 1
See application file for complete search history.

(56) References Cited

U.S. PATENT DOCUMENTS

| | | | |
|---|---|---|---|
| 5,014,982 A * | 5/1991 | Okada et al. | 463/29 |
| 5,388,841 A * | 2/1995 | San et al. | 463/44 |
| 5,599,232 A * | 2/1997 | Darling | 463/44 |
| 5,718,632 A | 2/1998 | Hayashi | |
| 5,838,890 A | 11/1998 | Aoki et al. | |
| 6,314,483 B1 * | 11/2001 | Goto et al. | 710/107 |
| 6,347,998 B1 * | 2/2002 | Yoshitomi et al. | 463/42 |
| 6,383,079 B1 * | 5/2002 | Takeda et al. | 463/43 |
| 6,458,033 B1 * | 10/2002 | Shoji | 463/35 |
| 6,540,613 B2 * | 4/2003 | Okubo et al. | 463/35 |
| 6,544,122 B2 * | 4/2003 | Araki et al. | 463/35 |
| 6,729,618 B1 * | 5/2004 | Koenig et al. | 273/138.2 |
| 6,857,960 B2 * | 2/2005 | Okubo et al. | 463/35 |

FOREIGN PATENT DOCUMENTS

| | | |
|---|---|---|
| JP | 6-075792 | 3/1994 |
| JP | 8-155145 | 6/1996 |
| JP | 2001-157776 | 6/2001 |
| WO | WO 00/06271 | 2/2000 |

OTHER PUBLICATIONS http://www.sm128c.com; Super Mario 128 Central; N64 Review: Mario Party.
Super Mario 64; Nintendo-Instruction Booklet.

* cited by examiner

*Primary Examiner*—Scott Jones
*Assistant Examiner*—Milap Shah
(74) *Attorney, Agent, or Firm*—Jordan and Hamburg LLP

(57) ABSTRACT

A game progress program is provided that allows a player to play an interesting secondary game while the main program and associated data are being loaded, without increasing the amount of data to be stored. While the main program and associated data are being loaded into the RAM, the background sound output controller reads the background sound data from the background sound data storage unit and outputs background sounds from the speaker, and the operation sound output controller receives player operations via the first key, second key and fourth key located on the controller, reads out from the operation sound data storage unit the operation sound data associated with each key, and outputs operation sounds from the speaker.

4 Claims, 4 Drawing Sheets

VIDEO GAME APPARATUS, GAME PROGRESS METHOD AND GAME PROGRESS PROGRAM

BACKGROUND OF THE INVENTION

1. Field of the Invention

The present invention relates to a video game apparatus which causes a main game to progress via reading from a recording medium of a main program for executing a main game and data used in this main program, as well as to a game progress program and game progress method used in such apparatus.

2. Description of the Related Art

In recent years, improvements in hardware performance have enabled home video game apparatuses to display games with increased detail and richness. In addition, by using a recording medium that can record a large amount of data, such as a CD-ROM or a DVD-ROM, exciting and detailed games can be conveniently played in the home via these home video game apparatuses.

Games can be played on the video game apparatus described above by first reading into an internal RAM a game-related program together with image, sound and other data from a recording medium, and by then having a CPU read out the program and data from the RAM.

However, a certain period of time is required for the video game apparatus described above to read in (load) the data to a storage unit of the video game apparatus, i.e., the RAM, from the CD-ROM, DVD-ROM or other recording medium. In particular, improvements in the performance of hardware such as video game apparatuses has enabled complex image processing, and the amount of data that can be loaded has increased dramatically. This has caused the loading time to increase to approximately 5–10 seconds, which is essentially wasted time to the person waiting to start playing the game, who feels bored during this period.

Furthermore, during loading of the game to the RAM from the recording medium in a conventional video game apparatus, there is no sound, an image is displayed on the display unit such as a television monitor indicating that the loading process is underway, and there is nothing to entertain the player who is waiting to start playing the game.

Accordingly, in order to resolve these problems in the conventional art described above, Japanese Patent No. 2742394, for example, describes a technology wherein prior to the reading of the main program and other components that execute the main game, a secondary game is played, while the main game is loading, by reading a secondary program and other components comprising a small number of commands and a small amount of data. This technology enables the player to quickly become involved in the game without worrying about the loading time for the main program and other components that contain a large amount of commands and data.

However, in order to execute the secondary game during the loading of the main program and other components that execute the main game, using the method of the conventional art, a program and other components to execute the secondary game must be stored separately from the main game on a recording medium and in the RAM of the video game apparatus, which increases the amount of data that must be stored on the recording medium and in the video game apparatus RAM. Moreover, even where the secondary game is not to be played, because the program and other components for the secondary game must be loaded each time the main program and other components are loaded, time and other resources are consumed by processing of this secondary game.

SUMMARY OF THE INVENTION

It is an object of the present invention to provide a video game apparatus, game progress method, and a game progress program which are free from the problems residing in the prior art.

According to an aspect of the present invention, a main program and associated data for performing a main game is read in and stored. A secondary game different from the main game using a part of the main program and associated data for the main program that were read into the storage means is executed.

These and other objects, features, aspects, and advantages of the present invention will become more apparent from the following detailed description of the preferred embodiments/examples with reference to the accompanying drawings.

DESCRIPTION OF THE PREFERRED EMBODIMENTS

A home video game apparatus according to an embodiment of the present invention will be described. The home video game apparatus that is constructed by connecting a home game machine to a home television is described as an example of a video game apparatus in accordance with an embodiment of the present invention. However, the present invention is not limited to this example, and may also be applied in the same fashion in a personal computer that functions as a video game apparatus by executing a video game program.

Figure 1:
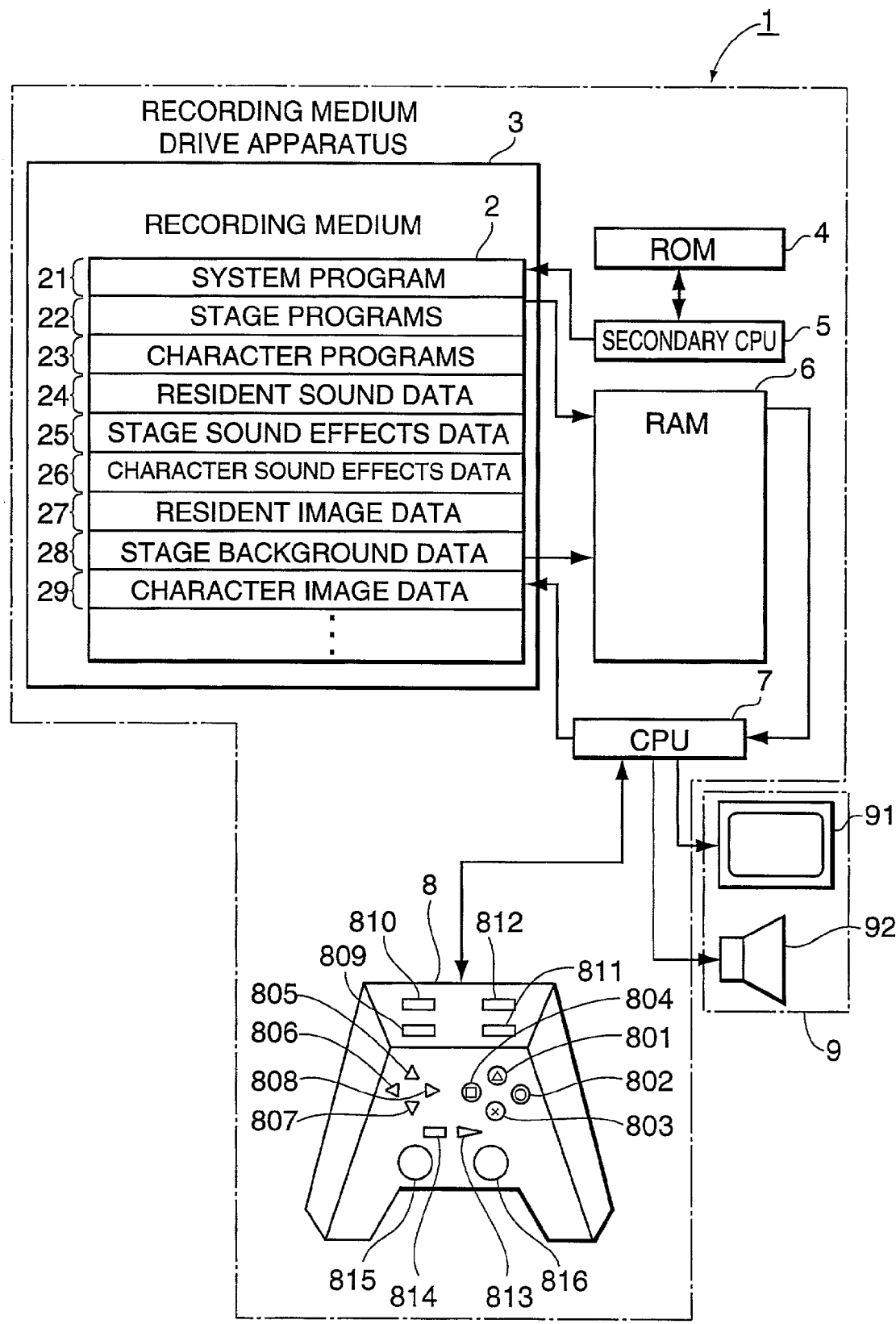
FIG. 1 is a block diagram showing a construction of main components of a video game apparatus in accordance with an embodiment of the invention.

The video game apparatus shown in FIG. 1 includes a home game machine 1 and a home television 9. A computer-readable recording medium 2 on which program data is recorded is installed in the home game machine 1. In addition, for ease of explanation, the interface circuit, the bus and other components are omitted from the drawing.

The home game machine 1 includes a recording medium 2, a recording medium drive apparatus 3, a Read-Only Memory or ROM 4, a secondary Central Processing Unit or secondary CPU 5, a Random-Access Memory or RAM 6, a Central Processing Unit or CPU 7, and a controller 8.

The home television 9 includes a television monitor 91 and a speaker 92. In addition, where the video game apparatus is constructed based on a personal computer, workstation or the like. The television monitor 91 or the like corresponds to a computer display.

In this embodiment, the main program is a skateboarding game, and the secondary game is a sound game. In this skateboarding game, a character displayed on the television monitor 91 is operated using the controller 8 comprising an operation unit, such that multiple preset game stages are cleared in sequence. In the sound game, eight drum beats, for example, are emitted during loading as BGM (background music), and the player causes various operation sounds corresponding to the various keys comprising operation members located on the controller 8 to be emitted to the rhythm of these drum beats.

The video game apparatus executes a secondary game by using as the program and data for the secondary game a part of the main program and its associated data that are stored in a resident area of the RAM 6 that cannot be overwritten once data is loaded therein, and maintains the player's interest by allowing the player to play this secondary game during the reading (loading) of the main program used for the main game and the data used by this main program.

The main game is not limited to the skateboarding game described above, and various types of other games may be used, such as other sports games, role-playing games or shooting games. Furthermore, the secondary game is not limited to the sound game described above, and may comprise a different type of game.

A resident area in this embodiment is an area in the memory in which a resident program and resident data are stored, and these resident program and resident data are a program and data that always reside in the memory while the game is being played. In other words, once they are loaded into a prescribed area of the RAM 6, the resident program and resident data are always stored therein until the power supply to the video game apparatus is terminated, and cannot be overwritten.

The various constituent elements shown in FIG. 1 will now be explained. The recording medium 2 comprises a recording medium regarding which a certain amount of time is required for the reading of data, such a CD-ROM or a DVD-ROM, and stores in a computer-readable fashion the main program and associated data. The recording medium 2 is driven by the recording medium drive apparatus 3, whereby the recorded contents of the recording medium 2, such as the main program and the associated data, are read out, and the read-out program and associated data are forwarded from the recording medium drive apparatus 3 to a prescribed storage area of the RAM 6 via the bus (not shown in the drawing), and are stored therein. A part of the main program and associated data are used as the secondary program and associated data used to execute the sound game.

Recorded on the recording medium 2 are principally a system program (resident program) 21 that executes and controls other programs as an OS (operating system), stage programs 22 that comprise operation programs for each stage, character programs 23 that comprise operation programs for each character, resident sound data (resident data) 24 that comprises sound data that is frequently used in the main game when a command is selected, for example, stage sound effects data 25 that comprises sound effects data for each stage, character sound effects data 26 that comprises unique sound effects data for each character, resident image data (resident data) 27 that comprises image data frequently used in the main game, stage background data 28 that comprises background image data for each stage, and character image data 29 that comprises image data for each character.

The system program 21 through character programs 23 comprise the main program that executes the main game, and the resident sound data 24 through character image data 29 comprise the associated data used to execute the main game.

The system program 21 includes a program to execute the secondary program, and the resident sound data 24 includes data for the program to execute the secondary game.

The recording medium drive apparatus 3 reads the main program and associated data from the recording medium 2, and comprises a DVD-ROM drive where the recording medium 2 is a DVD-ROM, a CD-ROM drive where the recording medium 2 is a CD-ROM, an optical disk drive where the recording medium 2 is an optical disk, etc.

The ROM 4 stores the image data and the sound data that are used when booting the home game machine 1 as well as an initialization program that reads out the contents recorded on the recording medium 2.

The secondary CPU 5 reads out the system program 21 recorded on the recording medium 2 by reading out and executing the initialization program stored in the ROM 4, and instructs that such program be read out to a prescribed storage area in the RAM 6.

The RAM 6 stores either on a continual or temporary basis the main program and associated data read in from the recording medium 2. In this embodiment, the RAM 6 is divided into a main memory 61 that stores the main program that executes each process, a sound memory 62 that stores data pertaining to sounds comprising associated data, and a video memory 63 that stores image data comprising associated data, but the present invention is not limited to this implementation, and it is also acceptable if all three types of information are stored in one RAM.

Figure 2:
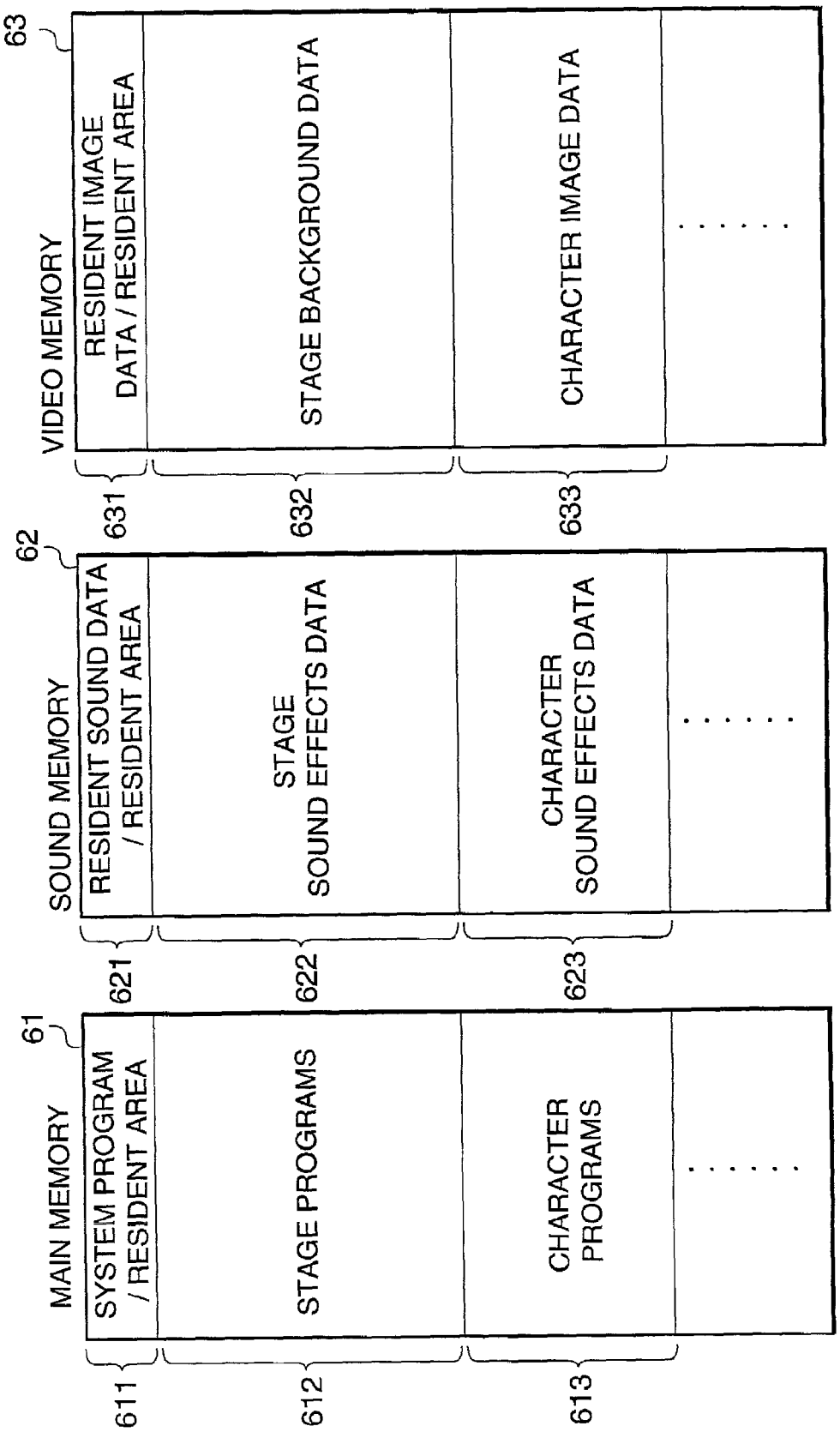
FIG. 2 is a drawing showing a construction of memory areas of a RAM of the apparatus shown in FIG. 1.

FIG. 2 is a diagram showing one example of the construction of the memory areas of the RAM 6. In this embodiment, the RAM 6 comprises the main memory 61, the sound memory 62 and the video memory 63.

The main memory 61 is an area that stores the main program to execute the main game, and includes, for example, a resident area 611 in which the system program is stored, an area 612 in which the stage programs are stored, and an area 613 in which the character programs are stored. The system program 21 from the recording medium 2 is read into the resident area 611, which is an area that is not overwritten once this program is written thereto. The stage programs 22 from the recording medium 2 are read into the area 612, which is an area that is overwritten each time the stage changes. The character programs 23 from the recording medium 2 are read into the area 613, which is an area that is overwritten each time the character changes.

The sound memory 62 is an area in which data pertaining to sounds used in the main game is stored, and includes, for example, a resident area 621 in which is stored resident sound data comprising resident sound waveform data, an area 622 in which is stored stage sound effects data, and an area 623 in which is stored character sound effects data. Resident sound data 24 from the recording medium 2 is read into the resident area 621, which is an area that is not overwritten once data is written thereto. Resident stage sound effects data 25 from the recording medium 2 is read into the area 622, which is an area that is overwritten each time the stage changes. Resident character sound effects data 26 from the recording medium 2 is read into the area 623, which is an area that is overwritten each time the character changes.

The video memory 63 is an area in which image data used in the main game is stored, and includes, for example, a resident area 631 in which is stored resident image data, an area 632 in which is stored stage background data, and an area 633 in which is stored character image data. Resident image data 27 from the recording medium 2 is read into the resident area 631, which is an area that is not overwritten once data is written thereto. Stage background data 28 from the recording medium 2 is read into the area 632, which is an area that is overwritten each time the stage changes. Character image data 29 from the recording medium 2 is read into the area 633, which is an area that is overwritten each time the character changes.

Again, with reference to FIG. 1, the controller 8 is an operation unit used by the user in order to input various operation instructions, and the operation signals corresponding to the user's operations are sent to the CPU 7. The controller 8 includes a first key 801, a second key 802, a third key 803, a fourth key 804, an up direction key 805, a left direction key 806, a down direction key 807, a right direction key 808, an L1 key 809, an L2 key 810, an R1 key 811, an R2 key 812, a start key 813, a select key 814, a left stick 815 and a right stick 816.

The up direction key 805, left direction key 806, down direction key 807 and right direction key 808 are used, for example, to issue to the CPU 7 instructions to shift the character or the cursor up or down or to the right or left on the screen of the television monitor 91.

The start key 813 is used, for example, to issue to the CPU 7 an instruction to load the game program from the recording medium 2. The select key 814 is used, for example, to issue to the CPU 7 an instruction to make various selections regarding the game program loaded into the main memory 61 from the recording medium 2.

With the exception of the left stick 815 and the right stick 816, each key of the controller 8 consists of an ON/OFF switch that becomes ON when it is pressed from the neutral position via external pressure, and becomes OFF when the external pressure is released and the key returns to the neutral position.

The left stick 815 and the right stick 816 are each a sticklike controller that is essentially identical to a so-called 'joystick'. In other words, each is constructed such that it has a vertical stick that can be tilted in every direction, i.e., in a 360° range, using a prescribed position on the stick as the fulcrum. In accordance with the direction and degree of stick tilt for the left stick 815 and the right stick 816, the values of the x-axis coordinate in the left-right direction and the y-axis coordinate in the front-back direction, using the neutral position as the origin, are sent to the CPU 7 as operation signals via an interface circuit not shown in the drawing.

The L1 key 809, L2 key 810, R1 key 811 and R2 key 812 are used to execute various functions in accordance with the game program loaded from the recording medium 2.

The operation of the video game apparatus shown in FIG. 1 will now be described. First, when the power supply to the home game machine 1 is turned ON, the secondary CPU 5 reads out the system program 21 from the recording medium 2 via the initialization program stored in the ROM 4, and then reads it into the resident area 611 of the main memory 61 of the RAM 6. The reading of the programs and data to the RAM 6 from the recording medium 2 is thereafter controlled by the system program 21.

The CPU 7 subsequently reads out the resident sound data 24 stored on the recording medium 2 based on the system program 21, and then reads it into the resident area 621 of the sound memory 62 of the RAM 6. The other components of the main program and the associated data are then loaded in sequence.

Figure 3:
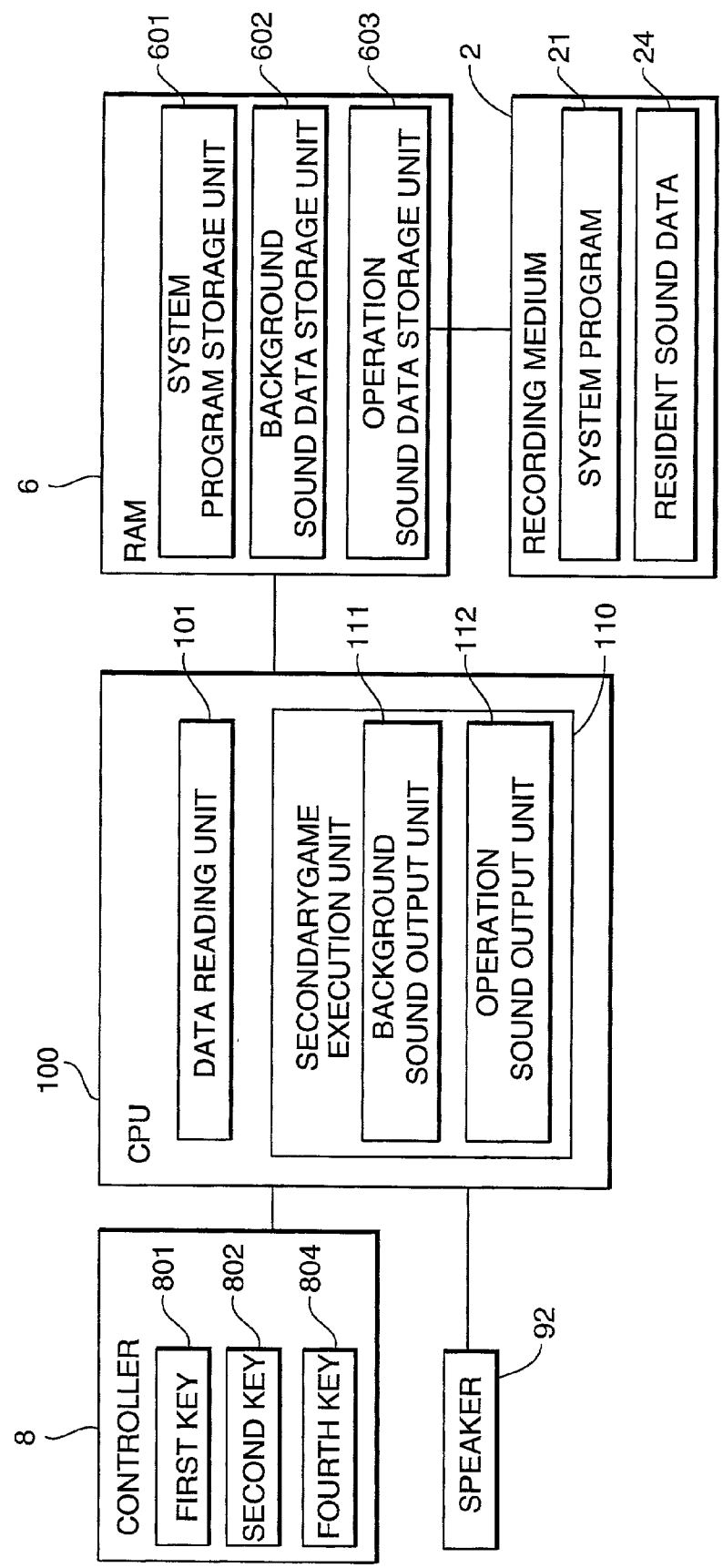
FIG. 3 is a block diagram showing a functional construction of a CPU, focusing on the operation of the video game apparatus shown in FIG. 1.

FIG. 3 is a block diagram showing the functional construction of the secondary CPU 5 and the CPU 7 that principally carry out the operation of the video game apparatus shown in FIG. 1. The CPU 100 shown in the drawing is used in order to regard and functionally describe the secondary CPU 5 and the CPU 7 shown in FIG. 1 as a single CPU.

The CPU 100 functions as a data reading unit 101 that reads out the main program and associated data stored on the recording medium 2 and writes them to the RAM 6, and also functions as a secondary game execution unit 110 that executes the secondary game by reading out and executing the secondary game program stored in the resident area 611 of the main memory 61. The secondary game execution unit 110 includes a background sound output controller 111 and an operation sound output controller 112. The RAM 6 functions as a system program storage unit 601 that stores the system program 21, as a background sound data storage unit 602 that stores background sound data, and as an operation sound data storage unit 603 that stored operation sound data.

The data reading unit 101 instructs the RAM 6 to read the system program 21 located on the recording medium 2 to the system program storage unit 601 comprising the resident area 611 of the main memory 61 of the RAM 6, and as well as to read the resident sound data 24 located on the recording medium 2 to the resident area 621 of the main memory 62 of the RAM 6. When this is done, the background sound data and operation sound data are stored in the background sound data storage unit 602 and the operation sound data storage unit 603 that collectively comprise the resident area 621 of the main memory 62 of the RAM 6.

The background sound output controller 111 determines that loading is underway and executes control to read out the background sound data stored in the background sound data storage unit 602 of the RAM 6 and output the background sound data from the speaker 92. In this embodiment, for the background sound data, for example, eight drum beat sounds are stored. So long as the background sounds are stored in the resident area 621 as data associated with the main program, they may comprise any desired sound.

Upon receiving a player operation via the controller 8 comprising an operation unit, the operation sound output controller 112 executes control to read out from the operation sound data storage unit 603 the operation sounds associated with each key comprising an operation member located on the controller 8 and to output the operation sound from the speaker 92. In this embodiment, an output sound for a sound 1 (cursor cancel sound) is associated with the first key 801 of the controller 8, an output sound for a sound 2 (cursor selection sound) is associated with the second key 802 of the controller 8, and an output sound for a sound 3 (menu screen advancement tone) is associated with the fourth key 804 of the controller 8. In other words, the operation sound data storage unit 603 stores sound source data for operation sounds associated with each key of the controller 8.

The association of output sounds with the various keys of the controller 8 is not limited to the above implementation, and output sounds may be associated with other keys of the controller 8, or other output sounds stored in the resident area 621 as data for the main program may be associated with the various keys of the controller 8.

In this embodiment, the data reading unit 101 and the RAM 6 are equivalent to storage means, the secondary game execution unit 110 is equivalent to secondary game execution means, the background sound output controller 111 is equivalent to background sound output means, the operation sound output controller 112 is equivalent to operation sound output means, the RAM 6 is equivalent to a storage unit, the controller 8 is equivalent to an operation unit, and the first key 801, second key 802 and fourth key 804 are equivalent to operation members.

Figure 4:
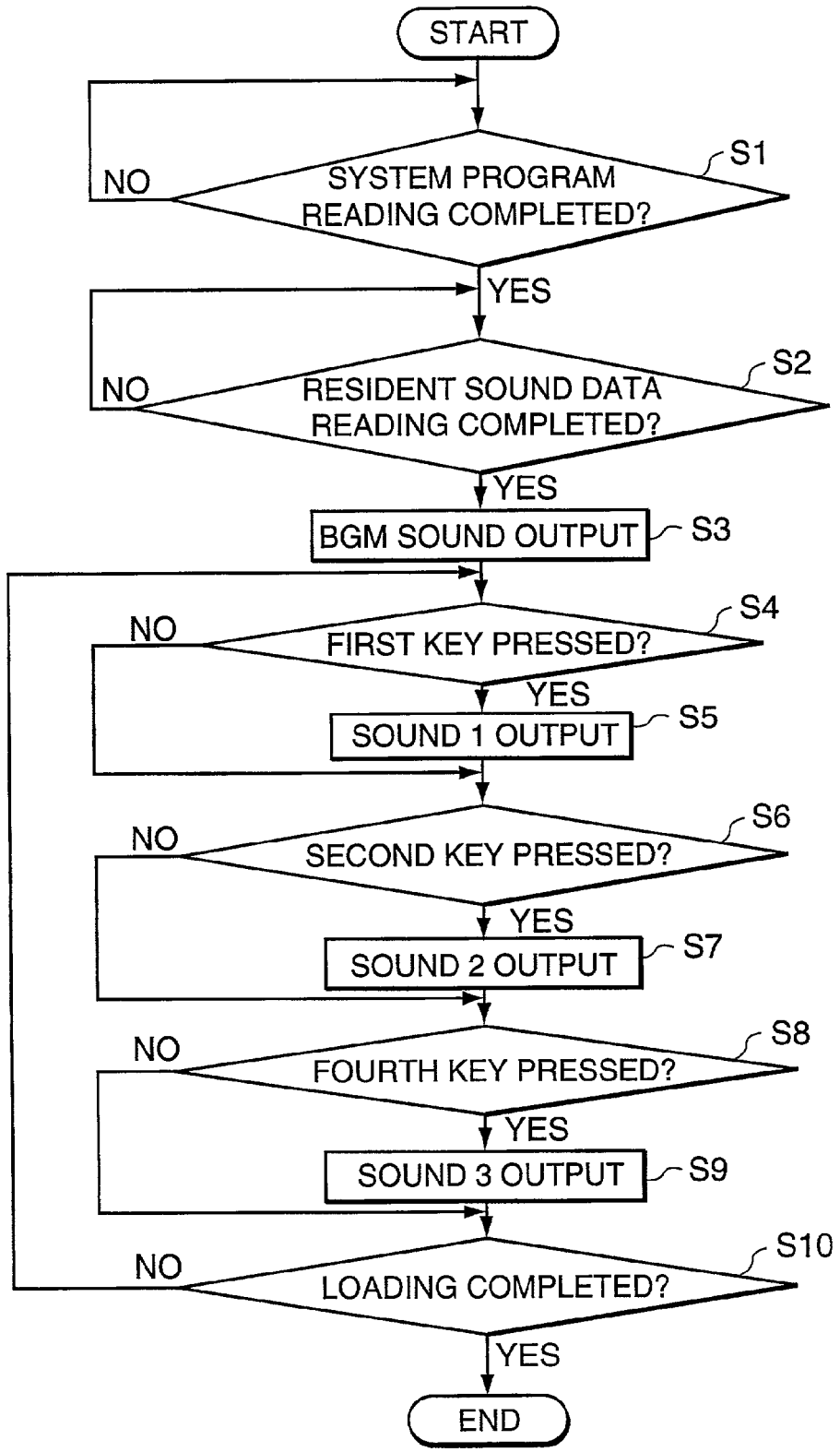
FIG. 4 is a flow chart showing a secondary game routine executed by the video game apparatus shown in FIG. 1.

FIG. 4 is a flow chart showing the secondary game routine executed by the video game apparatus shown in FIG. 1. In step 1, the CPU 7 determines whether or not the reading of the system program 21 to the RAM 6 has ended, and if it is determined that reading has ended, the CPU 7 advances to step S2, while if reading has not ended, the determination of step S1 is repeated.

In step S2, the CPU 7 determines whether or not the reading of the resident sound data 24 to the RAM 6 has ended, and if it is determined that reading has ended, the CPU 7 advances to step S3, while if reading has not ended, the determination of step S2 is repeated.

In step S3, the background sound output controller 111 determines that loading is underway and outputs eight drum beat sounds from the speaker 92.

In step S4, the operation sound output controller 112 determines whether or not the first key 801 has been pressed, and if it determines that the first key 801 has been pressed, it then outputs the sound 1 from the speaker 92 (step S5). If the first key 801 was not pressed in step S4, the CPU 7 advances to step S5.

In step S6, the operation sound output controller 112 determines whether or not the second key 802 has been pressed, and if it determines that the second key 802 has been pressed, it then outputs the sound 2 from the speaker 92 (step S7). If the second key 802 was not pressed in step S6, the CPU 7 advances to step S8.

In step S8, the operation sound output controller 112 determines whether or not the fourth key 804 has been pressed, and if it determines that the fourth key 804 has been pressed, it then outputs the sound 3 from the speaker 92 (step S9). If the fourth key 804 was not pressed in step S8, the CPU 7 advances to step S10.

In step S10, the CPU 7 determines whether or not reading has ended, and if it is determined that reading has ended, the routine ends, while if it is determined that reading has not ended, the CPU 7 returns to step S4, and the processes of steps S4 through S9 are executed.

Through the above routine, background sounds comprising BGM are output as a secondary game during the loading of the main program and associated data, player operations using the first key 801, second key 802 and fourth key 804 are received, and operation sounds corresponding to these keys are output. In this way, a simple secondary game can be played by operating the keys of the controller 8 to the rhythm of the background sounds while the main program and associated data are being loaded.

In the above description, a part of the main program and associated data used to execute the main game was used as the program and data used to execute the secondary game, but it is acceptable if a dedicated program and data are added instead of using a part of the main program and associated data.

Furthermore, while the main program and associated data used to execute the main game were read to the RAM 6 from the recording medium 2, it is also acceptable if such program and data are read from a ROM cartridge using a semiconductor, or if they are read from another server or the like over a prescribed network such as the Internet.

As described above, a game progress program is used to run a main game. Such program causes a video game apparatus to function as storage means that reads in and stores a main program and associated data used to run the main game, and as secondary game execution means that runs a secondary game that is different from the main game using a part of the main program and associated data that were read into the storage means. The program constitutes a game progress program product together with a signal bearing media bearing the program. The signal bearing media may be a computer readable storage medium such as floppy disk, hard disk devices, optical disks (e.g., CD-ROM, DVD) and transmission type media such as digital and analog communication links, including the Internet.

The main program and associated data used to execute the main game are read in and stored by the video game apparatus, and a secondary game that is different from the main game is executed by the video game apparatus using a part of the main program and associated data that were read into the storage means.

As a result, because a part of the main program and associated data for the main game are used as a program and data to execute the secondary game, there need not exist a separate program and data to execute the secondary game. Furthermore, because the secondary game can be executed at least after the part of the main program and associated data for the main game are loaded, the secondary game can be executed while the main program and the associated data are being loaded.

Because the secondary game can be executed during loading of the main program and associated data that are used to execute the main game, without the need for a separate program and data to execute the secondary game, the interesting secondary game can be played during loading of the main program and associated data without increasing the amount of data to be stored.

The storage means stores a part of the main program that executes the secondary game in a resident area.

The program used to execute the secondary game that comprises a part of the main program is stored in a resident area that is not overwritten once data is stored therein. Consequently, when the program used to execute the secondary game is initially stored in the resident area from the recording medium or the like by the storage means, there is no longer any need to load a program to execute the secondary game while the main program is loading. In this way, once the program to execute the secondary game comprising a part of the main program is stored in the resident area, the secondary program can be executed at any time.

The video game apparatus comprises an operation unit that has operation members used by the player to input operation instructions, and the secondary game execution means comprises background sound output means that outputs background sounds while the main program and associated data are being loaded, as well as operation sound output means that outputs prescribed operation sounds that correspond to the operations input by the player using the operation members.

For the secondary game, background sounds comprising background music (BGM) are output during loading of the main program and associated data, and prescribed operation sounds are output in response to the operation instructions input by the player using the operation members.

In this way, the player can easily play the secondary program during loading of the main program and associated data by operating the operation members to the rhythm of the background sounds.

A simple secondary game can be played during loading of the main program and associated data. Accordingly, the player can be kept entertained even while waiting for the main program and associated data to load.

The storage means stores the sound source data used to output the background sounds in a resident area.

The sound source data used to output the background sounds is stored in a resident area that is not overwritten once the data is stored therein. Consequently, when the sound source data used to output the background sounds is initially stored in the resident area from the recording medium or the like by the storage means, there is no longer any need to load the sound source data used to output the background sounds while the data associated with the main program and used to execute the main game is loading. In this way, once the sound source data used to output the background sounds comprising a part of the main program-associated data is stored in the resident area, the secondary program can be executed at any time.

The storage means stores the sound source data used to output the operation sounds in a resident area.

The sound source data used to output the operation sounds is stored in a resident area that is not overwritten once the data is loaded therein. Consequently, when the sound source data used to output the operation sounds is initially stored in the resident area from the recording medium or the like by the storage means, there is no longer any need to load the sound source data used to output the operation sounds while the main program-associated data used to execute the main game is loading. In this way, once the sound source data used to output the operation sounds comprising a part of the main program-associated data is stored in the resident area, the secondary program can be executed at any time.

An inventive game progress method causes a main game to progress using a video game apparatus that includes a storage unit, and comprises a storage step in which the video game apparatus reads in and stores the main program and associated data for the main game, and a secondary game execution step in which the video game apparatus executes a secondary game that is different from the main game using a part of the main program and associated data for the main program that were read into the storage means.

The main program and associated data for the main game are read in and stored by the video game apparatus, and a secondary game that is different from the main game is executed by the video game apparatus using a part of the main program and associated data that were read into the storage means.

As a result, because a part of the main program and associated data for the main game are used as a program and data to execute a secondary game, there need not exist a separate program and data to execute the secondary game. Furthermore, because the secondary game can be executed at least after the part of the main program and associated data for the main game are loaded, the secondary game can be executed while the main program and associated data are being loaded. An inventive video game apparatus causes a main game to progress using a main program and associated data. The apparatus includes storage means that reads in and stores the main program and associated data used to execute the main game, and secondary game execution means that executes a secondary game that is different from the main game using a part of the main program and associated data that were read into the storage means.

The main program and associated data used to execute the main game are read in and stored, and a secondary game that is different from the main game is executed using a part of the main program and associated data that were read into the storage means.

A part of the main program and associated data used to execute the main game are used as a program and data to execute a secondary game, there need not exist a separate program and data to execute the secondary game. Furthermore, because the secondary game can be executed at least after the part of the main program and associated data used to execute the secondary game are loaded, the secondary game can be executed while the main program and associated data therewith are being loaded.

This application is based on patent application No. 2001-189493 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A video game apparatus comprising:
an input device including a plurality of input members for a user to perform input operations respectively on;
storage means for reading in and storing game software in a first game storing phase and a second game storing phase, the game software including a main game program and associated game data configured to execute a main game;
the first game storing phase reading in and storing in a resident memory area a first part of the main game program and associated game data including a game system program and associated game sound data, said game system program including portions for generating operation sounds using said associated game sound data in response to the input operations performed on the input device, respective ones of the operation sounds corresponding to operations on respective ones of said input members, said game system program further including portions for generating background sounds using said associated game sound data stored in said resident memory;
the second game storing phase reading in and storing a second part of the main program and associated game data which is a remainder of the main game program and associated game data other than said first part;
secondary game execution means for executing a secondary game in response to completion of the first game storing phase and during said second game storing phase, said secondary game execution means using said first part of said main game program and associated game data, including said game system program of said main game for generating the respective ones of said operation sounds using said associated game sound data on the respective input members corresponding to said respective operation sounds, and said secondary game execution means using said first part of said main game program and associated game data for generating background sounds using said portions of said game system program for generating background sounds to enable the user to perform said input operations on the respective input members in response to the generated background sounds; and a main game program execution means for executing said main game, after completion of said second game storing phase, the main game using said first part of the main game program, including said game system program stored in said resident memory during said first game program storing phase, and said second part of the main game program stored during said second game storing phase.

2. The video game apparatus according to claim 1 wherein said secondary game execution means comprises:

background sound output means using said game system program of said first part of the main game program for generating said background sounds using said associated game sound data stored in said resident memory area while the remainder of the main game program and the associated game data are loaded into said storage means; and an operation sound output means using said game system program of said first part of the main game program for outputting said respective ones of said operation sounds by reading out the associated game sound data, from said resident memory area of the storage means, corresponding to the input operations given by the user while the remainder of the main game program and the associated game data are loaded into said storage means.

3. A recording medium storing in executable form a game storage and execution program for operating a video game apparatus including a storage unit having a resident memory, and a user input unit having a plurality of input members for accepting input operations by the user, the program operating the video game apparatus to execute the steps of:

reading in and storing game software in a first game storing phase and a second game storing phase, the game software including a main game program and associated game data configured to execute a main game;

the first game storing phase reading in and storing in a resident memory area a first part of the main game program and associated game data including a game system program and associated game sound data, said game system program including portions for generating operation sounds using said associated game sound data in response to the input operations performed on the input device, respective ones of the operation sounds corresponding to operations on respective ones of said input members, said game system program further including portions for generating background sounds using said associated game sound data stored in said resident memory;

the second game storing phase reading in and storing a second part of the main program and associated game data which is a remainder of the main game program and associated game data other than said first part;

receiving input operations from said input unit;

executing a secondary game in response to completion of the first game storing phase and during said second game storing phase, said executing said secondary game using said first part of said main game program and associated game data, including executing said game system program of said main game for generating for generating the respective ones of said operation sounds using said associated game sound data on the respective input members corresponding to said respective operation sounds, and said secondary game execution using said first part of said main game program and associated game data for generating background sounds using said portions of said game system program for generating background sounds to enable the user to perform said input operations on the respective input members in response to the generated background sounds; and executing said main game, after completion of said second game storing phase, the main game using said first part of the main game program, including said game system program stored in said resident memory during said first game program storing phase, and said second part of the main game program stored during said second game storing phase.

4. The recording medium of claim 3 wherein said executing of said secondary game comprises:

using said game system program of said first part of the main game program for generating said background sounds using said associated game sound data stored in said resident memory area while the remainder of the main game program and the associated game data are are being stored; and using said game system program of said first part of the main game program for outputting said respective ones of said operation sounds by reading out the associated game sound data, from said resident memory area, corresponding to the input operations given by the user while the remainder of the main game program and the associated game data being stored.

* * * * *